United States Patent
Zhou et al.

(10) Patent No.: US 12,204,666 B2
(45) Date of Patent: Jan. 21, 2025

(54) CONTINUOUS DATA PROTECTION SYSTEM AND METHOD FOR MODERN APPLICATIONS

(71) Applicant: Aishu Technology Corp., Shanghai (CN)

(72) Inventors: Feng Zhou, Shanghai (CN); Hongfu He, Shanghai (CN); Sha Tong, Shanghai (CN)

(73) Assignee: AISHU TECHNOLOGY CORP., Shanghai (CN)

( * ) Notice: Subject to any disclaimer, the term of this patent is extended or adjusted under 35 U.S.C. 154(b) by 0 days.

(21) Appl. No.: 17/996,190

(22) PCT Filed: Oct. 28, 2020

(86) PCT No.: PCT/CN2020/124229
§ 371 (c)(1),
(2) Date: Oct. 13, 2022

(87) PCT Pub. No.: WO2021/208401
PCT Pub. Date: Oct. 21, 2021

(65) Prior Publication Data
US 2024/0281546 A1  Aug. 22, 2024

(30) Foreign Application Priority Data

Apr. 14, 2020 (CN) .......................... 202010289773.1

(51) Int. Cl.
*G06F 21/62* (2013.01)
(52) U.S. Cl.
CPC ................................ *G06F 21/6209* (2013.01)
(58) Field of Classification Search
CPC .................................................. G06F 21/6209
See application file for complete search history.

(56) References Cited

U.S. PATENT DOCUMENTS 6,957,221 B1   10/2005  Hart et al.
8,117,165 B1   2/2012   Winckelmann et al.
(Continued)

FOREIGN PATENT DOCUMENTS

CN    103092927 A    5/2013
CN    103838646      6/2014
(Continued)

OTHER PUBLICATIONS

International Search Report issued in application Serial No. PCT/CN2020/124229 on Jan. 12, 2021.
(Continued)

*Primary Examiner* — Simon P Kanaan
(74) *Attorney, Agent, or Firm* — Mark H. Whittenberger; Holland & Knight LLP

(57) ABSTRACT

Provided are a continuous data protection system and method for a modern application. The system includes a modern application module, a disaster recovery service module, and a data protection module. The modern application module includes a production service unit, a production service database, a production object storage gateway, a production object storage, and a production object database. The disaster recovery service module includes a disaster recovery service unit, a disaster recovery service database, a disaster recovery object storage gateway, disaster recovery object storage, and a disaster recovery object database corresponding to the production service unit, the production service database, the production object storage gateway, the production object storage, and the production object database respectively. The data protection module is configured to synchronize the production service database and the production object database to the disaster recovery service database and the disaster recovery object database in real time respectively.

10 Claims, 1 Drawing Sheet

(56) References Cited

U.S. PATENT DOCUMENTS

| | | | |
|---|---|---|---|
| 10,216,580 B1 | 2/2019 | Peleg et al. | |
| 2006/0059253 A1* | 3/2006 | Goodman | G06Q 10/10 709/223 |

FOREIGN PATENT DOCUMENTS

| | | |
|---|---|---|
| CN | 103875229 | 6/2014 |
| CN | 107038091 A | 8/2017 |
| CN | 107220005 | 9/2017 |
| CN | 108958989 A | 12/2018 |
| CN | 109067733 | 12/2018 |
| CN | 111581015 A | 8/2020 |
| WO | 2021/208401 A1 | 10/2021 |

OTHER PUBLICATIONS

First Office Action issued in Application Serial No. 202010289773 on Jan. 25, 2021.

* cited by examiner

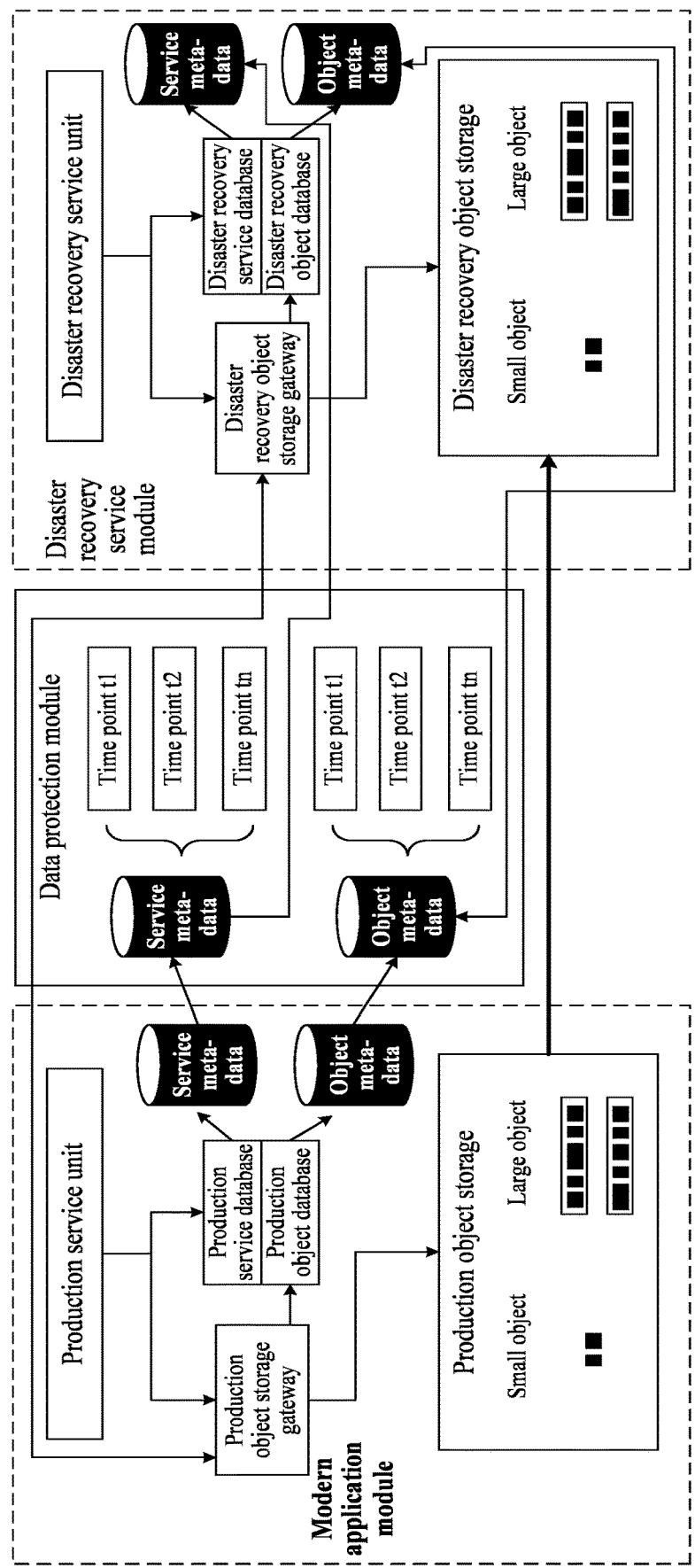

CONTINUOUS DATA PROTECTION SYSTEM AND METHOD FOR MODERN APPLICATIONS

RELATED APPLICATIONS

The subject application is a U.S. National Stage application of International Application No. PCT/CN2020/124229, filed on Oct. 28, 2020, which claims the benefit of Chinese Patent Application No. 202010289773.1, filed on Apr. 14, 2020. The contents of each application incorporated herein by reference.

TECHNICAL FIELD

The present application relates to computer data protection technology, for example, a continuous data protection system and method for a modern application.

BACKGROUND

With the rapid development of the Internet and the implementation of cloud technology, mobile working and cross-region collaboration are more and more popular. Under this background, modern application systems based on object storage emerge and develop rapidly. A modern application system includes a service unit, a database, and an object storage. The features of the modern application system are that data is stored in the object storage, and metadata is stored in the database. It is a problem to ensure service continuity of the entire modern application system.

Continuous data protection is generally implemented by replicating object storage, that is, data in the object storage is continuously replicated into co-urban or remote object storage. The replication time is long.

The related art also provides some solutions. Chinese Patent CN200910236822.9 proposes an object storage method and a system thereof. The method includes the following: When a client performs a write operation, the replica position information of an object file of the write operation is read from a metadata server. According to the replica position information, a write request is sent to the object storage server where a master replica is located. The object storage server where the master replica is located receives the write request, updates a local master replica, and forwards the write request to the object storage servers where backup replicas are located. After receiving the write request, the object storage servers where the backup replicas are located update local backup replicas and send responses to the object storage server where the master replica is located. The object storage server where the master replica is located receives the responses. After responses are received from the object storage servers where part backup replicas are located, a successful response to the write operation is sent to the client. In this manner, the write performance in the storage system can be improved.

However, the solution has the problems below.

In this solution, only the object file is protected, and there is no continuous protection measure for the metadata server. When a service system fails, there is only data but no service system metadata, and thus a service cannot be recovered. In this solution, the object file is directly used as a replication unit, and when a large number of object files with small data volumes are encountered, replication time and data migration time are still very long. As a result, a long-time service interruption is caused, and the risk of data loss increases with time, and the requirements for continuous data protection cannot be satisfied.

SUMMARY

The present application provides a continuous data protection system and method for a modern application, which has good security and high efficiency.

The present application may be implemented by the technical solutions hereinafter.

A continuous data protection system for a modern application includes a modern application module, a disaster recovery service module, and a data protection module.

The modern application module includes a production service unit, a production service database, a production object storage gateway, a production object storage, and a production object database.

The production service unit is connected to the production object storage gateway and the production service database. The production service unit is configured to generate a large object and small objects, generate service metadata, send the large object and the small objects to the production object storage gateway, and store the service metadata in the production service database.

The production object storage gateway is connected to the production object storage, the production object database, disaster recovery object storage, and a disaster recovery object storage gateway. The production object storage gateway is configured to receive the large object and the small objects, store the large object and the small objects in the production object storage, merge the small objects into a large object, generate object metadata, store the object metadata in the production object database, send large objects in the production object storage to the disaster recovery object storage in an initialization stage of continuous data protection, and after the initialization, continuously send the small objects and the large object in the production object storage to the disaster recovery object storage gateway and delete a sent small object in the production object storage.

The disaster recovery service module includes a disaster recovery service unit, a disaster recovery service database, a disaster recovery object storage gateway, disaster recovery object storage, and a disaster recovery object database corresponding to the production service unit, the production service database, the production object storage gateway, the production object storage, and the production object database, respectively.

The data protection module is connected to the production service database, the production object database, the disaster recovery service database, and the production object database and configured to synchronize the production service database and the production object database to the disaster recovery service database and the disaster recovery object database respectively in the initialization stage of the continuous data protection, and after the initialization, continuously perform log replication on the production service database and the production object database to generate log copies and record time points and synchronize the production service database to the disaster recovery service database in real time.

The disaster recovery object storage gateway is configured to receive the small objects and the large objects sent by the production object storage gateway, store the received small objects and the received large objects in the disaster recovery object storage, merge the received small objects into a large object, generate object metadata, and store the generated object metadata in the disaster recovery object database.

The disaster recovery service module is configured to take over a failed modern application module.

An initialization process includes the following: The data protection module synchronizes the production service database and the production object database to the disaster recovery service database and the disaster recovery object database respectively, and the production object storage gateway replicates the large objects in the production object storage into the disaster recovery object storage.

The data protection module is further configured to synchronize the disaster recovery service database and the disaster recovery object database to the production service database and the production object database respectively and send a newly added large object in the disaster recovery object storage to the production object storage gateway through the disaster recovery object storage gateway. The production object storage gateway is also configured to store the newly added large object in the production object storage to implement data migration.

The data protection module is further configured to recover the production service database or the production object database to a specified time point according to the log copies and the time points. The production object storage gateway is also configured to query the production object database for a large object corresponding to the specified time point and recover the large object to the production object storage to implement historical recovery.

The production service unit is also configured to send an object write request and an object read request to the production object storage gateway.

The production object storage gateway is configured to: in response to receiving the object write request, receive the small objects or the large object sent by the production service unit and store the received small objects or the received large object in the production object storage; and in response to the data volume of the small objects reaching a set threshold, merge the small objects into the large object, generate the object metadata, and store the object metadata in the production object database.

In response to receiving the object read request, the production object storage gateway is configured to determine whether the object metadata exists in the production object database. In response to the determination result that the object metadata exists in the production object database, the production object storage gateway is configured to access the data of a specified position and a specified length in the large objects in the production object storage according to the object metadata. In response to the determination result that the object metadata does not exist in the production object database, the production object storage gateway is configured to directly read the large objects in the production object storage.

The service metadata includes user information, user permission, file information, and an object name. The object metadata includes the name, offset, and length of the large object corresponding to the merged small objects.

The production object storage gateway and the disaster recovery object storage gateway each adopts an object storage S3 interface.

A continuous data protection method for a modern application includes the steps below.

The production service unit generates the large object, the small objects, and the service metadata, sends the large object and the small objects to the production object storage gateway, and stores the service metadata in the production service database. The production object storage gateway receives the large object and the small objects, stores the large object and the small objects in a production object storage, merges the small objects, stores the merged large object in the production object storage, generates the object metadata, stores the generated object metadata in the production object database, sends large objects to the disaster recovery object storage in the initialization stage of the continuous data protection, and after the initialization, continuously sends the small objects and the large objects in the production object storage to the disaster recovery object storage gateway and deletes the sent small object in the production object storage.

The data protection module is configured to synchronize the production service database and the production object database to the disaster recovery service database and the disaster recovery object database respectively in the initialization stage of the continuous data protection, and after the initialization, continuously perform the log replication on the production service database and the production object database to generate the log copies and record the time points and synchronize the production service database to the disaster recovery service database in real time.

The disaster recovery object storage gateway receives the small objects and the large objects sent by the production object storage gateway, stores the received small objects and the received large objects in the disaster recovery object storage, merges the received small objects into the large object, generates the object metadata, and stores the generated object metadata in the disaster recovery object database.

The disaster recovery service module takes over the failed modern application module. The disaster recovery service module includes a disaster recovery service unit, a disaster recovery service database, a disaster recovery object storage gateway, disaster recovery object storage, and a disaster recovery object database corresponding to the production service unit, the production service database, the production object storage gateway, the production object storage, and the production object database.

The initialization process includes the following: The data protection module synchronizes the production service database and the production object database to the disaster recovery service database and the disaster recovery object database respectively, and the production object storage gateway replicates the large objects in the production object storage into the disaster recovery object storage.

The data protection module synchronizes the disaster recovery service database and the disaster recovery object database to the production service database and the production object database respectively and sends a newly added large objects in the disaster recovery object storage to the production object storage gateway through the disaster recovery object storage gateway. The production object storage gateway stores the newly added large objects in the production object storage to implement the data migration.

The data protection module recovers the production service database or the production object database to a specified time point according to the log copies and the time points. The production object storage gateway queries the production object database for a large object corresponding to the specified time point and recovers the large object to the production object storage to implement the historical recovery.

The method also includes the following: The production service unit sends the object write request and the object read request to the production object storage gateway.

The production object storage gateway receives the large object and the small objects, stores the large object and the small objects in the production object storage, merges the small objects, generates the object metadata, and stores the generated object metadata in the production object database in the following manners: In response to receiving the object write request, the production object storage gateway receives the small objects or the large object sent by the production service unit and writes the received small objects or the received large object into the production object storage; and in response to the data volume of the small objects reaching the set threshold, merges the small objects into the large object, generates the object metadata, and stores the object metadata in the production object database.

The method also includes the following: In response to receiving the object read request, the production object storage gateway determines whether the object metadata exists in the production object database; and in response to the determination result that the object metadata exists in the production object database, the production object storage gateway accesses the data of a specified position and a specified length in the large objects in the production object storage according to the object metadata; or in response to the determination result that the object metadata does not exist in the production object database, the production object storage gateway directly reads the large objects in the production object storage.

The service metadata includes user information, user permission, file information, and an object name. The object metadata includes the name, offset, and length of the large object corresponding to the merged small objects.

The production object storage gateway and the disaster recovery object storage gateway each adopts the object storage S3 interface.

BRIEF DESCRIPTION OF DRAWINGS

FIG. 1 is a diagram illustrating the structure of a continuous data protection system for a modern application according to an embodiment of the present application.

DETAILED DESCRIPTION

The present application is described below in conjunction with drawings and embodiments. The embodiments are implemented on the basis of the solution of the present application. Embodiments and operation processes are given, but the scope of the present application is not limited to the embodiments hereinafter.

Embodiment One

This embodiment provides a continuous data protection system for a modern application. As shown in FIG. 1, the continuous data protection system for a modern application provided in this embodiment includes a modern application module, a disaster recovery service module, and a data protection module.

The modern application module includes a production service unit, a production service database, a production object storage gateway, production object storage, and a production object database. The production service unit is configured to generate a large object, small objects, and service metadata. The service metadata includes user information, user permission, file information, and an object name. The production service database is configured to store the service metadata. The address of accessing the production object storage by the modern application module is changed to the address of the production object storage gateway, so that all operations of accessing the production object storage by the modern application module are taken over by the production object storage gateway. The production object storage gateway is configured to receive the large object and the small objects. The production object storage is configured to store the large object and the small objects. The production object storage gateway is also configured to merge the small objects into a large object and store generated object metadata in the production object database. The object metadata includes the name, offset, and length of the large object corresponding to the merged small objects. The offset is the initial position of a small object in the large object. The length is the length of the small objects.

The address of accessing the production object storage by the production service unit is the address of the production object storage gateway, that is, the production service unit accesses the production object storage through the production object storage gateway. The production service unit is also configured to send an object write request and an object read request to the production object storage gateway. When the production object storage gateway receives the object write request, the production service unit sends the small objects or the large object to the production object storage gateway, and the production object storage gateway writes the received small objects or the received large object to the production object storage. When the data volume of the small objects reaches a set threshold, the production object storage gateway merges the small objects into one large object, generates the object metadata, and stores the object metadata in the production object database. When receiving the object read request, the production object storage gateway determines whether the object metadata exists in the production object database. If the object metadata exists in the production object database, the production object storage gateway accesses the data of a specified position and a specified length in the large objects according to the object metadata. If the object metadata does not exist in the production object database, the object storage gateway directly reads the large objects.

The disaster recovery service module includes a disaster recovery service unit, a disaster recovery service database, a disaster recovery object storage gateway, disaster recovery object storage, and a disaster recovery object database corresponding to the production service unit, the production service database, the production object storage gateway, the production object storage, and the production object database, respectively. The production object storage gateway and the disaster recovery object storage gateway each adopts an object storage S3 interface.

The data protection module is configured to synchronize the production service database and the production object database to the disaster recovery service database and the disaster recovery object database in real time respectively and continuously perform log replication on the production service database and the production object database to generate log copies and record time points.

The large objects in the production object storage are replicated into the disaster recovery object storage to complete initialization. The data protection module synchronizes the production service database to the disaster recovery service database in real time. The production object storage gateway continuously sends the small objects in the production object storage to the disaster recovery object storage gateway. The production object storage gateway deletes a sent small object. The disaster recovery object storage gateway merges the small objects into a large object and stores correspondingly generated object metadata in the disaster recovery object database. The disaster recovery service module takes over a failed modern application module to ensure service continuity, and all new data is stored in the disaster recovery service module.

When the modern application module is damaged, the disaster recovery service module takes over a service to ensure the service continuity.

After the modern application module is repaired, the data protection module synchronizes the disaster recovery service database and the disaster recovery object database to the production service database and the production object database, respectively. In the case where the data in the production object storage is not damaged, the disaster recovery object storage gateway merely needs to send the large object that is newly added after the disaster recovery service module takes over the service to the production object storage. In the case where the data in the production object storage is damaged, the disaster recovery object storage gateway needs to send all large objects in the disaster recovery object storage to the production object storage gateway to synchronize the large objects and the small objects that are newly generated by the disaster recovery service unit after the disaster recovery service module takes over the service to the production object storage. When the data in the production object storage is consistent with the data in the disaster recovery object storage, the service is switched back to the production service unit, and the production object storage gateway stores the large object and the small objects generated by the production service unit in the production object storage and synchronizes the large object and the small objects to the disaster recovery object storage. In this manner, service migration and new continuous data protection are implemented, so that full backup synchronization is prevented from being performed again, and the efficiency is improved.

If it is necessary to recover the modern application module to a historical version, the data protection module recovers the production service database or the production object database to a specified time point according to the log copies and the time points, queries the production object database for a corresponding large object, and recovers the large object to the production object storage, thereby implementing the effect of recovering to a historical time point.

A document cloud is used as an example. There are many users in the document cloud. The users have a large number of files such as pictures and documents. These files are stored in the production object storage. To ensure the service continuity, the disaster recovery service module needs to be built.

In this embodiment, a large object and a small object correspond to a large file and a small file of the production service unit respectively.

The large file is a file having a data volume greater than a threshold. The small file is a file having a data volume less than or equal to the threshold.

Embodiment Two

This embodiment provides a continuous data protection method for a modern application corresponding to embodiment one. The method includes the steps below.

The production service unit generates the large object, the small objects, and the service metadata and stores the service metadata in the production service database. The production object storage gateway receives the large object and the small objects and stores received the large object and the received small objects in the production object storage. The production object storage gateway merges the small objects and stores the generated object metadata in the production object database. The service metadata includes user information, user permission, file information, and an object name. The object metadata includes the name, offset, and length of the large object corresponding to the merged small objects.

The disaster recovery service unit, the disaster recovery service database, the disaster recovery object storage gateway, the disaster recovery object storage, and the disaster recovery object database, which correspond to the production service unit, the production service database, the production object storage gateway, the production object storage, and the production object database, are built. The production service database and the production object database are synchronized to the disaster recovery service database and the disaster recovery object database in real time respectively. The production object storage gateway and the disaster recovery object storage gateway each adopts the object storage S3 interface to implement the common interface of object storage.

The data protection module synchronizes the production service database and the production object database to the disaster recovery service database and the disaster recovery object database respectively and continuously performs the log replication on the production service database and the production object database to generate the log copies and record the time points.

The large object in the production object storage is replicated into the disaster recovery object storage. The production object storage gateway continuously sends the small objects in the production object storage to the disaster recovery object storage gateway. The production object storage gateway deletes the sent small object. The disaster recovery object storage gateway merges the small objects into the large object and stores the correspondingly generated object metadata in the disaster recovery object database. The address of accessing the production object storage by the production service unit is the address of the production object storage gateway, that is, the production service unit accesses the production object storage through the production object storage gateway.

The address of accessing the production object storage by the modern application module is changed to the address of the production object storage gateway, so that all operations of accessing the production object storage by the modern application module are taken over by the production object storage gateway.

The modern application module sends the object write request and the object read request to the production object storage gateway. When the production object storage gateway receives the object write request, the production service unit sends the small objects or the large object to the production object storage gateway, and the production object storage gateway writes the small objects or the large object to the production object storage. When the data volume of the small objects reaches the set threshold, the production object storage gateway merges the small objects into one large object; and at this time, the production object storage gateway does not delete the small objects, generates the object metadata, and stores the object metadata in the production object database. When the production object storage gateway receives the object read request, the production object storage gateway determines whether the object metadata exists in the production object database. If the object metadata exists in the production object database, the production object storage gateway accesses the data of a specified position and a specified length in the large objects according to the object metadata. If the object metadata does not exist in the production object database, the object storage gateway directly reads the large objects.

When the modern application module fails, the disaster recovery service module takes over the modern application module. After the modern application module is repaired, the data protection module synchronizes the disaster recovery service database and the disaster recovery object database to the production service database and the production object database, sends the newly added large object in the disaster recovery object storage to the production object storage gateway through the disaster recovery object storage gateway, and stores the newly added large object in the production object storage. In this manner, incremental synchronization is completed, and the service migration and the new continuous data protection are implemented, so that the full backup synchronization is prevented from being performed again, and the efficiency is improved.

If it is necessary to recover the modern application module to a historical version, the data protection module recovers the production service database or the production object database to a specified time point according to the log copies and the time points, queries the production object database for a corresponding large object, and recovers the large object to the production object storage, thereby implementing the effect of recovering to a historical time point.

The document cloud is used as an example. There are many users in the document cloud. The users have a large number of files such as pictures and documents. These files are stored in the production object storage. To ensure the service continuity, the disaster recovery service module needs to be built.

Embodiment one and embodiment two provide a continuous data protection system and method for a modern application to solve the problem of continuous data protection of the modern application module. When the modern application module fails, the disaster recovery service module may quickly take over the service and provide services. After the modern application module is repaired, the service migration may be quickly performed to satisfy the requirement of the service continuity.

In the present application, the production object storage gateway receives and sends the large object and the small objects. The data protection module synchronizes the service metadata and the object metadata. The modern application module has the same structure as the disaster recovery service module. Only one full backup replication is needed, that is, the production service database and the production object database are synchronized to the disaster recovery service database and the disaster recovery object database respectively, and the large object in the production object storage is sent to the disaster recovery object storage to complete the initialization. It is merely necessary to synchronize the production service database and the disaster recovery service database by the data protection module in real time, send the newly added large object and the small objects in the production object storage to the disaster recovery object storage gateway by the production object storage gateway, store the large object and the small objects in the disaster recovery object storage, merges the small objects, and stores the newly generated object metadata in the disaster recovery object database by the disaster recovery object storage gateway, in order to implement incremental replication with high efficiency. Alternatively, when the modern application module fails, the disaster recovery service module may take over the service to ensure the service continuity. After the modern application module is repaired, if the data in the production object storage is not damaged, only the newly added data in the disaster recovery service module needs to be migrated to complete the service migration, and the speed is high. Otherwise, all the data in the disaster recovery service module needs to be migrated.

In the present application, the log replication is continuously performed on the production service database and the production object database to generate the log copies and record the time points. The production service database or the production object database is recovered to a specified time point according to logs and the time points. In this manner, the operation is convenient, and the security is good.

In the present application, the production object storage gateway automatically merges the small objects reaching a certain data volume into the large object and transmits the large object, thereby improving the efficiency of data transmission.

What is claimed is:

1. A continuous data protection system for a modern application, comprising:
a modern application module comprising a production service unit, a production service database, a production object storage gateway, a production object storage, and a production object database, wherein
the production service unit is connected to the production object storage gateway and the production service database, and the production service unit is configured to generate a large object, small objects, and service metadata, send the large object and the small objects to the production object storage gateway, and store the service metadata in the production service database; and
the production object storage gateway is connected to the production object storage, the production object database, disaster recovery object storage, and a disaster recovery object storage gateway, and the production object storage gateway is configured to receive the large object and the small objects, store the large object and the small objects in the production object storage, merge the small objects into a large object, generate object metadata, store the object metadata in the production object database, send large objects in the production object storage to the disaster recovery object storage in an initialization stage of continuous data protection, and after the initialization, continuously send the small objects and the large objects in the production object storage to the disaster recovery object storage gateway and delete a sent small object in the production object storage;
a disaster recovery service module comprising a disaster recovery service unit, a disaster recovery service database, the disaster recovery object storage gateway, the disaster recovery object storage, and a disaster recovery object database corresponding to the production service unit, the production service database, the production object storage gateway, the production object storage, and the production object database, respectively; and
a data protection module, wherein the data protection module is connected to the production service database, the production object database, the disaster recovery service database, and the disaster recovery object database and is configured to synchronize the production service database and the production object database to the disaster recovery service database and the disaster recovery object database respectively in the initialization stage of the continuous data protection, and after the initialization, continuously perform log replication on the production service database and the production object database to generate log copies and record time points and synchronize the production service database to the disaster recovery service database in real time, wherein the disaster recovery object storage gateway is configured to receive the small objects and the large objects sent by the production object storage gateway, store the received small objects and the received large objects in the disaster recovery object storage, merge the received small objects into a large object, generate object metadata, and store the generated object metadata in the disaster recovery object database;

the disaster recovery service module is configured to take over a failed modern application module; and an initialization process comprises synchronizing, by the data protection module, the production service database and the production object database to the disaster recovery service database and the disaster recovery object database respectively and replicating, by the production object storage gateway, the large objects in the production object storage into the disaster recovery object storage.

2. The system according to claim 1, wherein the data protection module is further configured to synchronize the disaster recovery service database and the disaster recovery object database to the production service database and the production object database respectively and send a newly added large object in the disaster recovery object storage to the production object storage gateway through the disaster recovery object storage gateway, and the production object storage gateway is further configured to store the newly added large object in the production object storage to implement data migration; and the data protection module is further configured to recover the production service database or the production object database to a specified time point according to the log copies and the time points, and the production object storage gateway is further configured to query the production object database for a large object corresponding to the specified time point and recover the large object to the production object storage to implement historical recovery.

3. The system according to claim 1, wherein the production service unit is further configured to send an object write request and an object read request to the production object storage gateway; and the production object storage gateway is configured to: in response to receiving the object write request, receive the small objects or the large object sent by the production service unit and store the received small objects or the received large object in the production object storage; and in response to a data volume of the small objects reaching a set threshold, merge the small objects into the large object, generate the object metadata, and store the object metadata in the production object database; and in response to receiving the object read request, determine whether the object metadata exists in the production object database; and in response to a determination result that the object metadata exists in the production object database, access data of a specified position and a specified length in the large objects in the production object storage according to the object metadata, or in response to a determination result that the object metadata does not exist in the production object database, read the large objects in the production object storage.

4. The system according to claim 1, wherein the service metadata comprises user information, user permission, file information, and an object name, and the object metadata comprises a name, an offset and a length of the large object corresponding to the merged small objects.

5. The system according to claim 1, wherein the production object storage gateway and the disaster recovery object storage gateway each adopts an object storage S3 interface.

6. A continuous data protection method for a modern application, comprising:

generating, by a production service unit, a large object, small objects, and service metadata, sending the large object and the small objects to a production object storage gateway, and storing the service metadata in a production service database; and receiving, by the production object storage gateway, the large object and the small objects, storing the large object and the small objects in a production object storage, merging the small objects, storing a merged large object in the production object storage, generating object metadata, storing the generated object metadata in a production object database, in an initialization stage of continuous data protection, sending large objects to disaster recovery object storage, and after the initialization, continuously sending the small objects and the large objects in the production object storage to a disaster recovery object storage gateway and deleting a sent small object in the production object storage;

synchronizing, by a data protection module, the production service database and the production object database to a disaster recovery service database and a disaster recovery object database respectively in the initialization stage of the continuous data protection, and after the initialization, continuously performing log replication on the production service database and the production object database to generate log copies and record time points and synchronizing the production service database to the disaster recovery service database in real time;

receiving, by the disaster recovery object storage gateway, the small objects and the large objects sent by the production object storage gateway, storing the received small objects and the received large objects in the disaster recovery object storage, merging the received small objects into a large object, generating object metadata, and storing the generated object metadata in the disaster recovery object database; and taking over, by a disaster recovery service module, a failed modern application module, wherein the disaster recovery service module comprises a disaster recovery service unit, the disaster recovery service database, the disaster recovery object storage gateway, the disaster recovery object storage, and the disaster recovery object database corresponding to the production service unit, the production service database, the production object storage gateway, the production object storage, and the production object database, wherein an initialization process comprises synchronizing, by the data protection module, the production service database and the production object database to the disaster recovery service database and the disaster recovery object database respectively and replicating, by the production object storage gateway, the large objects in the production object storage into the disaster recovery object storage.

7. The method according to claim 6, further comprising, synchronizing, by the data protection module, the disaster recovery service database and the disaster recovery object database to the production service database and the production object database respectively and sending a newly added large object in the disaster recovery object storage to the production object storage gateway through the disaster recovery object storage gateway, and storing, by the production object storage gateway, the newly added large object in the production object storage to implement data migration; and recovering, by the data protection module, the production service database or the production object database to a specified time point according to the log copies and the time points, and querying, by the production object storage gateway, the production object database for a large object corresponding to the specified time point and recovering the large object to the production object storage to implement historical recovery.

8. The method according to claim 6, further comprising sending, by the production service unit, an object write request and an object read request to the production object storage gateway, wherein receiving, by the production object storage gateway, the large object and the small objects, storing the large object and the small objects in the production object storage, merging the small objects, generating the object metadata, and storing the generated object metadata in the production object database comprise: in response to receiving the object write request, receiving, by the production object storage gateway, the small objects or the large object sent by the production service unit and writing the received small objects or the received large object into the production object storage; and in response to a data volume of the small objects reaching a set threshold, merging the small objects into the large object, generating the object metadata, and storing the object metadata in the production object database; and the method further comprises: in response to receiving the object read request, determining, by the production object storage gateway, whether the object metadata exists in the production object database; and in response to a determination result that the object metadata exists in the production object database, accessing data of a specified position and a specified length in the large objects in the production object storage according to the object metadata, or in response to a determination result that the object metadata does not exist in the production object database, reading the large objects in the production object storage.

9. The method according to claim 6, wherein the service metadata comprises user information, user permission, file information, and an object name, and the object metadata comprises a name, an offset and a length of the large object corresponding to the merged small objects.

10. The method according to claim 6, wherein the production object storage gateway and the disaster recovery object storage gateway each adopts an object storage S3 interface.

* * * * *